United States Patent [19]

Ando et al.

[11] Patent Number: 4,711,674

[45] Date of Patent: Dec. 8, 1987

[54] NON-BRONZING REDDISH LAKE PIGMENT

[75] Inventors: Hirohito Ando, Itako; Zenji Takada, Kamisu; Yuko Shigeta, Choshi, all of Japan

[73] Assignee: Dainippon Ink and Chemicals, Inc., Tokyo, Japan

[21] Appl. No.: 926,530

[22] Filed: Nov. 4, 1986

[30] Foreign Application Priority Data

Nov. 8, 1985 [JP] Japan .................................. 60-248918

[51] Int. Cl.$^4$ ................................................ C09C 3/00
[52] U.S. Cl. .................................... 106/289; 106/306; 106/308 R
[58] Field of Search .................... 106/289, 308 R, 306

[56] References Cited

U.S. PATENT DOCUMENTS

| | | | |
|---|---|---|---|
| 4,235,982 | 11/1980 | Maslanka et al. | 525/260 |
| 4,282,060 | 8/1981 | Maslanka et al. | 427/391 |
| 4,664,715 | 5/1987 | Jesse | 106/289 |

*Primary Examiner*—Paul Lieberman
*Assistant Examiner*—Willie J. Thompson
*Attorney, Agent, or Firm*—Sherman and Shalloway

[57] ABSTRACT

A non-bronzing reddish lake pigment obtained by treating a reddish lake pigment with an N-(3-alkoxy-2-hydroxypropyl)trialkylammonium salt represented by the general formula

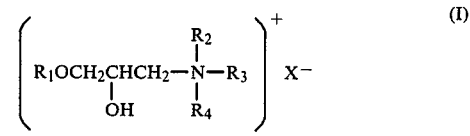

wherein each of $R_1$, $R_2$, $R_3$ and $R_4$ represents an alkyl group having 1 to 30 carbon atoms, and X represents a halogen atom, a sulfonic acid radical, an acetic acid radical or a formic acid radical.

11 Claims, No Drawings

NON-BRONZING REDDISH LAKE PIGMENT

This invention relates to a reddish lake pigment for use in printing inks, which has good dispersibility and is free from a bronzing phenomenon attributed to light scattering occurring on the surface of the pigment particles.

Red ink used in process inks gives colorful prints by over-printing it with blue ink or yellow ink. However, since a reddish lake pigment for red ink has a marked bronzing phenomenon, it causes "haze" to violet formed when over-printed with blue ink or to sheashell pink formed when printed in superimposition with yellow ink. It has been desired therefore to develop a reddish lake pigment which is free from the bronzing phenomenon (non-bronzing).

There has been scarcely any research or literature on reducing the bronzing phenomenon. In the past, bronzing of a pigment has been reduced from experience by treating its surface with a large quantity (for example, at least 30% by weight based on the pigment) of rosin or a rosin-type resin. According to this method, the concentration of the pigment is low. Furthermore, the adaptability of the treated pigment to the dampening water is reduced, and troubles during printing, such as scumming, frequently occur.

In order to develop a non-bronzing reddish lake pigment, the present inventors have extensively studied treatment of the pigment surface with anionic active agents, nonionic active agents, amine-type active agents, quaternary ammonium salt-type cationic active agents, phosphoric ester-type active agents, etc., and have found that when a reddish lake pigment is treated with a relatively small amount of an N-(3-alkoxy-2-hydroxypropyl)trialkyl ammonium salt, there can be obtained an easily dispersible reddish lake pigment.

Thus, according to this invention, there is provided a non-bronzing reddish lake pigment obtained by treating a reddish lake pigment with an N-(3-alkoxy-2-hydroxypropyl)trialkylammonium salt represented by the general formula

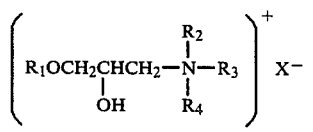

wherein each of $R_1$, $R_2$, $R_3$ and $R_4$ represents an alkyl group having 1 to 30 carbon atoms, and X represents a halogen atom, a sulfonic acid radical, an acetic acid radical or a formic acid radical.

In the ammonium salt represented by general formula (I), at least one of $R_1$, $R_2$, $R_3$ and $R_4$ is preferably an alkyl group having 8 to 18 carbon atoms. Especially preferred ammonium salts of formula (I) are those in which $R_1$ is an alkyl group having 8 to 18 carbon atoms, and at least one of $R_2$, $R_3$ and $R_4$ is an alkyl group having 8 to 18 carbon atoms because they have excellent water resistance. Examples of the halogen atom in formula (I) represented by X are chlorine, bromine and iodine atoms. The chlorine atom is preferred. Examples of the sulfonic acid radical for X are a sulfuric acid radical, a methylsulfuric acid radical, an ethylsulfuric acid radical, a benzenesulfonic acid radical and a naphthalenesulfonic acid radical.

Specific examples of the ammonium salt represented by general formula (I) include
N-(3-octoxy-2-hydroxypropyl)-trimethyl ammonium chloride,
N-(3-decyloxy-2-hydroxypropyl)-trimethyl ammonium chloride,
N-(3-lauroxy-2-hydroxypropyl)-trimethyl ammonium chloride,
N-(3-myristoxy-2-hydroxypropyl)-trimethyl ammonium chloride,
N-(3-cetoxy-2-hydroxypropyl)-trimethyl ammonium chloride,
N-(3-stearoxy-2-hydroxypropyl)-trimethyl ammonium chloride,
N-(3-oleyloxy-2-hydroxypropyl)-trimethyl ammonium chloride,
N-(2-linoyloxy-2-hydroxypropyl)-trimethyl ammonium chloride,
N-(3-behenoxy-2-hydroxypropyl)-trimethyl ammonium chloride,
N-(3-stearoxy-2-hydroxypropyl)-triethyl ammonium bromide,
N-(3-stearoxy-2-hydroxypropyl)-triethyl ammonium sulfate,
N-(3-stearoxy-2-hydroxypropyl)-triethyl ammonium formate,
N-(3-stearoxy-2-hydroxypropyl)-triethyl ammonium acetate,
N-(3-dodecyloxy-2-hydroxypropyl)-monohexadecyl dimethyl ammonium chloride,
N-(3-tridecyloxy-2-hydroxypropyl)-monooctadecyl dimethyl ammonium chloride,
N-(3-stearoxy-2-hydroxypropyl)-monostearyl dimethyl ammonium chloride,
N-(3-stearoxy-2-hydroxypropyl)-monooleyl dimethyl ammonium chloride,
N-(3-dodecyloxy-2-hydroxypropyl)-monopalmityl dimethyl ammonium chloride,
N-(3-ethoxy-2-hydroxypropyl)-distearyl monomethyl ammonium chloride,
N-(3-oleyloxy-2-hydroxypropyl)-tripropyl ammonium chloride,
N-(3-beef tallow alkoxy-2-hydroxypropyl)-triethyl ammonium chloride,
N-(3-coconut alkoxy-2-hydroxypropyl)-triethylammonium chloride,
N-(3-palm alkoxy-2-hydroxypropyl)-triethyl ammonium chloride,
N-(3-stearoxy-2-hydroxypropyl)-monostearyl dimethyl ammonium monomethylsulfate,
N-(3-stearoxy-2-hydroxypropyl)-monostearyldimethyl ammonium benzenesulfate, and
N-(3-stearoxy-2-hydroxypropyl)-monostearyl dimethyl ammonium naphthalenesulfate.

These ammonium salts may be used singly or as a mixture of two or more. For example, they are commercially availabel under the tradenames ADEKAMIN ® 4MAC-30 [a mixture comprising N-(3-laurylalkoxy-2-hydroxypropyl)-triethyl ammonium chloride as a main component produced by Asahi Denka Kogyo Co., Ltd.], ADEKAMIN ®4DAC-85 [a mixture comprising N-(3-laurylalkoxy-2-hydroxpropyl)-monopalmityl dimethyl ammonium chloride as a main component produced by the same company].

The reddish lake pigment to be treated by this invention denotes a lake pigment having a varying shade of red ranging from a red color with a strong tint of blue such as bordeaux and brown to a red color with a strong tint of yellow such as scarlet and orange. For example, this reddish pigment is obained by using a coupler component having naphthalene as a skeleton such as beta-naphthol, beta-hydroxynapthoic acid and beta-hydroxynapthanilides. Examples of the reddish lake pigment include naphthol-type azo lake pigments represented by the following general formula (II)

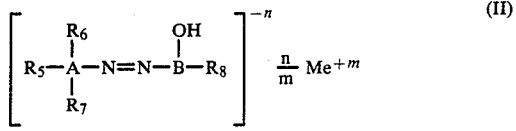

wherein

A represents a phenyl or naphthyl group;

B represents a naphthyl group;

each of $R_5$, $R_6$ and $R_7$ represents a hydrogen atom, a halogen atom, an alkyl group having 1 to 4 carbon atoms, an alkoxy group having 1 to 4 carbon atoms, a carbomethoxy group, a carboethoxy group, a nitro group, a trifluoromethyl group, a carboxyl group, a sulfonic acid group, a carbamoyl group of the general formula

in which $R_9$ represents a hydrogen atom, a phenyl group, a phenyl group substituted by halogen, $C_1$-$C_4$ alkyl, $C_1$-$C_4$ alkoxy, carbomethoxy, carboethoxy and/or nitro, a naphthyl group, and a naphthyl group substituted by halogen, $C_1$-$C_4$ alkyl, $C_1$-$C_4$ alkoxy, carbomethoxy, carboethoxy and/or nitro, a benzimidazolone group or a phthalimide group, or a carboxamide group of the general formula

in whi $R_{10}$ represents a methyl group, an ethyl group, a phenyl group, a phenyl group substituted by halogen, $C_1$-$C_4$ alkyl, $C_1$-$C_4$ alkoxy, carbomethoxy, carboethoxy and/or nitro, a naphthyl group, and a naphthyl group substituted by halogen, $C_1$-$C_4$ alkyl, $C_1$-$C_4$ alkoxy, carbomethoxy, carboethoxy and/or nitro;

$R_8$ represents a carboxyl group, a sulfonic acid group, or a carbamoyl group of the general formula —CONH—$R_9$ in which $R_9$ is as defined above;

with the proviso that 1 to 3 of $R_5$, $R_6$, $R_7$ and $R_8$ represent a carboxyl group and/or a sulfonic acid group;

Me represents a sodium atom, a potassium atom, a magnesium atom, a calcium atom, a strontium atom, a barium atom, a manganese atom or an aluminum atom;

n represents the number of carboxyl groups and/or sulfonic acid groups; and m represents the valency of Me.

Specific examples of the reddish lake pigments are C.I. Pigment Red 48, C.I. Pigment Red 49, C.I. Pigment Red 52, C.I. Pigment Red 53, C.I. Pigment Red 57, C.I. Pigment Red 58, C.I. Pigment Red 60, C.I. Pigment Red 63, C.I. Pigment Red 68, C.I. Pigment Red 81, C.I. Pigment Red 82, C.I. Pigment Red 83, C.I. Pigment Red 84, C.I. Pigment Red 90, C.I. Pigment Red 151, C.I. Pigment Red 172, C.I. Pigment Red 173, C.I. Pigment Red 174 and C.I. Pigment Red 247.

Treatment of the reddish lake pigment is not particularly limited, and may be effected by mixing it with the ammonium salt of general formula (I) before or after lake formation. Usually, the treatment is carried out by the following procedure (1) or (2).

(1) The ammonium salt of general formula (I) is added to an aqueous suspension of a reddish lake pigment obtained by a conventional method. After the addition, the mixture is stirred at 0 to 100° C. for 1 to 30 minutes The treating temperature may be determined depending upon the degree of transparency required of the pigment. A period of 30 minutes suffices as the stirring time for the treatment. The effect of stirring remains unchanged even when the treating time is made longer than 30 minutes. The desired non-bronzing pigment is thus obtained.

(2) A water-wet cake of a reddish lake pigment obtained by a conventional method is flashed with an ink varnish in the presence of the ammonium salt of general formula (1) to obtain an ink flash base of a non-bronzing pigment.

The amount of the ammonium salt of general formula (I) used in treating the reddish lake pigment is usually 0.1 to 30 parts by weight, preferably 0.5 to 10 parts by weight, per 100 parts by weight of the pigment. It may be added in an amount of more than 30 parts by weight, but this is economically disadvantageous.

Quaternary ammonium salt-type active agents other than the ammonium salts of general formula (I), such as stearyl trimethyl ammonium chloride, octadecyl trimethyl ammonium chloride, palm alkyl dimethylbenzyl ammonium chloride and dilauryl dimethyl ammonium chloride, have a small effect of reducing bronzing, and even when used in an amount of 30 parts by weight, they cannot sufficiently reduce bronzing. When these other ammonium salts are used in an amount of more than 30 parts by weight, they are not practical from the standpoint of the concentration of the pigment, the cost, etc. But the combined use of the other ammonium salts with the ammonium salt of general formula (I), however, has the advantage that dispersibility and flowability of the pigment can be improved in addition to the reduction of bronzing.

British Pat. No. 1,187,116, U.S. Pat. Nos. 3,560,235, and 1,080,115, British Pat. No. 1,080,115 and Canadian Pat. No. 845,022 disclose that to improve the dispersibility and flowability of pigments, the pigments are treated with anionic surfactants such as fatty acids, sulfosuccinic esters, higher alcohol sulfates and rosin and metal (calcium, strontium, barium, etc.) salts thereof, cationic surfactants such as aliphatic amines and aliphatic diamines, or various noninonic surfactants. Treatment of reddish lake pigments with such surfactants cannot produce a non-bronzing effect. However, these surfactants may be used in combination with the ammonium salts of general formula (I).

Red ink prepared by using the non-bronzing reddish lake pigment does not develop the bronzing phenomenon, and prints obtained by using this red ink have no "hazy" color and are very clear. The nonbronzing pigment in accordance with this invention also has better dispersibility than the non-treated pigment.

The following Examples, Comparative Examples and Test Examples illustrate the present invention further. All parts and percentages in these examples are by weight.

EXAMPLE 1

One hundred parts of 2-amino-5-methylbenzenesulfonic acid was dispersed in 1,500 parts of water, and 105 parts of 20% hydrochloric acid was added. While the mixture was maintained at a temperature of less than 5° C., 124 parts of a 30% aqueous solution of sodium nitrite was added dropwise to diazotize 2-amino-5-methylbenzenesulfonic acid.

Then, 102 parts of 2-hydroxy-3-naphthoic acid was dispersed in 3,000 parts of water, and then 95 parts of a 48% aqueous solution of sodium hydroxide was added to form a solution. The solution was cooled to less than 5° C. With stirring, the diazo solution obtained above was added dropwise to the resulting coupler solution, and after the coupling reaction, 200 parts of a 10% aqueous solution of tall oil rosin sodium salt was added, and the mixture was stirred for 30 minutes. A solution of 100 parts of calcium chloride hydrate in 500 parts of water was added, and the mixture was stirred for 60 minutes to terminate the lake-forming reaction.

Two parts of N-(3-stearoxy-2-hydroxypropyl)monostearyl dimethyl ammonium chloride was added to an aqueous suspension containing 100 parts of the resulting pigment (C.I. Pigment Red 57:1), and the mixture was stirred at 80° C. for 30 minutes. It was hot-filtered, washed with water and dried at 80° C. to give 100.4 parts of a pigment powder having a bluish red color.

This pigment powder (25.0 parts) and 75.0 parts of an ink varnish composed mainly of a rosin-modified phenolic resin were kneaded by subjecting them to a three-roll mill three times at 40° C. to prepare an ink. The ink was drawn down by an ink knife on a coated paper, and the bronzing of the ink film was evaluated by visual observation.

The dispersibility of the pigment was determined by sandwiching a small amount of the ink with slide glasses for a microscope, applying a temperature of 90° C. and a pressure of 1 kg/10 cm$^2$ to form a thin film of the ink, and calculating the number of particles having a size greater than 1 micrometer under a microscope (100 X) by a computer image analysis system. Larger numbers of the particles show lower dispersibility. The results are shown in Table 1.

COMPARATIVE EXAMPLE 1

A pigment powder (98.8 parts) having a bluish red color was prepared by operating in the same way as in Example 1 except that N-(3-stearoxy-2-hydroxypropyl)mono-stearyl dimethyl ammonium chloride was not used. The bronzing and dispersibility of the pigment were evaluated as in Example 1. The results are shown in Table 1.

COMPARATIVE EXAMPLE 2

A pigment powder (122 parts) having a bluish red color was prepared by operating in the same way as in Example 1 except that 24 parts of N-distearyl dimethyl ammonium chloride was used instead of 2 parts of N-(3-stearoxy-2-hydroxypropyl)monostearyl dimethyl ammonium chloride. The bronzing and dispersibility of the pigment were evaluated as in Example 1. The results are shown in Table 1.

TABLE 1

|  | Hue | Bronzing (*) | Dispersibility (number of particles) |
|---|---|---|---|
| Example 1 | Bluish red | O | 45 |
| Comparative Example 1 | " | X | 528 |
| Comparative Example 2 | " | Δ | 195 |

(*): Evaluation of the bronzing was as follows:
O: No bronzing
Δ: Some bronzing
X: Marked bronzing

EXAMPLES 2–12

In each run, a pigment powder was prepared by operating in the same way as in Example 1 except that each of the N-(3-alkoxy-2-hydroxypropyl)trialkyl ammonium salts of general formula (I) in the amounts indicated in Table 2 was used instead of N-(3-stearoxy-2-hydroxypropyl)monostearyl dimethyl ammonium chloride. The bronzing and dispersibility of the pigment powder were evaluated as in Example 1. The results are shown in Table 2.

TABLE 2

General formula: $\left[ R_1OCH_2CHCH_2-\underset{\underset{R_4}{|}}{\overset{\overset{R_2}{|}}{N}}-R_3 \right]^+ X^-$ (I), with OH on the middle carbon.

| Example | Amount of the compound (I) (parts) | R$_1$ | R$_2$ | R$_3$ | R$_4$ | X | Bronzing (*) | Dispersibility (number of particles) |
|---|---|---|---|---|---|---|---|---|
| 2 | 3 | C$_{12}$H$_{25}$ | C$_{16}$H$_{33}$ | CH$_3$ | CH$_3$ | Cl | O | 55 |
| 3 | 5 | C$_{13}$H$_{27}$ | C$_{18}$H$_{37}$ | CH$_3$ | CH$_3$ | Cl | O | 24 |
| 4 | 10 | C$_{14}$H$_{29}$ | C$_2$H$_5$ | C$_2$H$_5$ | C$_2$H$_5$ | Cl | O | 28 |
| 5 | 0.5 | C$_8$H$_{17}$ | C$_{22}$H$_{45}$ | CH$_3$ | CH$_3$ | Cl | O | 84 |
| 6 | 20 | C$_{18}$H$_{37}$ | C$_{16}$H$_{33}$ | CH$_3$ | CH$_3$ | Br | O | 25 |
| 7 | 30 | C$_{12}$H$_{25}$ | C$_{16}$H$_{33}$ | CH$_3$ | CH$_3$ | I | O | 17 |
| 8 | 5 | C$_8$H$_{17}$ | C$_8$H$_{17}$ | C$_8$H$_{17}$ | C$_8$H$_{17}$ | Cl | O | 28 |
| 9 | 5 | C$_{18}$H$_{37}$ | CH$_3$ | CH$_3$ | CH$_3$ | CH$_3$SO$_4$ | O | 13 |
| 10 | 5 | C$_{12}$H$_{25}$ | C$_2$H$_5$ | C$_2$H$_5$ | C$_2$H$_5$ | 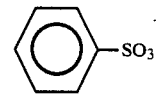 | O | 44 |

TABLE 2-continued

| | Amount of the compound (I) | General formula | $R_1OCH_2CHCH_2{-}\!\!\underset{\underset{R_4}{|}}{\overset{\overset{R_2}{|}}{N}}\!\!{-}R_3$ $\;\;\;\;\;\;\;\;\;\;\;\;\;\;\;\;\;\;\;\;\;\;\;$ OH | | | $\Bigg]^+$ $X^-$ (I) | Bronzing | Dispersibility (number of |
|---|---|---|---|---|---|---|---|---|
| Example | (parts) | $R_1$ | $R_2$ | $R_3$ | $R_4$ | X | (*) | particles) |
| 11 | 5 | $C_{12}H_{25}$ | $C_2H_5$ | $C_2H_5$ | $C_2H_5$ | 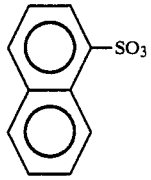 | O | 51 |
| 12 | 5 | $C_{12}H_{25}$ | $C_2H_5$ | $C_2H_5$ | $C_2H_5$ | $CH_3COO$ | O | 47 |

(*) Same as the footnote to Table 1.

EXAMPLE 13

Five hundred parts of the wet cake (the pigment content of the wet cake was 25%) of the untreated pigment after filtration as obtained in Comparative Example 2 was flashed in a kneader together with 300 parts of an ink varnish and 2.5 parts of N-(3-stearoxy-2-hydroxypropyl)monostearyl dimethyl ammonium chloride to prepare a base ink. The ink varnish was further added to the base ink to adjust the pigment concentration of the ink to 25.0%, and the ink was drawn down on a coated paper by an ink knife. No bronzing occurred in the ink film, and the dispersibility of the pigment (the number of particles) was 10 and very good.

EXAMPLE 14

Thirty parts of sodium 2-amino-4-chloro-5-methylbenzenesulfonate was diazotized by a conventional method. Then, 28.0 parts of 2-hydroxy-3-naphthoic acid was dispersed in 2,000 parts of water, and 64 parts of a 20% aqueous solution of sodium hydroxide was added to form a solution. Ice was added to the solution to adjust its temperature to 0° C. The diazo solution was added dropwise to the coupler solution obtained as above to perform coupling reaction. The pH of slurry containing the resulting azo compound was adjusted to 8.0, and the slurry was heated to 45° C. The slurry was stirred for 30 minutes, and then, an aqueous solution of 43 parts of strontium chloride hydrate in 1,000 parts of water was added dropwise to convert the azo compound into a lake pigment (C.I. Pigment Red 48:3). The resulting pigment dispersion was stirred at 80° C. for 30 minutes, and a dispersion of 3 parts of N-(3-oleyloxy-2-hydroxypropyl)monolauryl dimethyl ammonium chloride was dispersed in 100 parts of water, and the mixture was stirred further at 80° C. for 30 minutes. The product was hot-filtered, washed thoroughly with water, and dried to give 60.5 parts of a pigment powder having a slightly yellowish red color. The bronzing and dispersibility of the resulting pigment powder were evaluated in the same way as in Example 1. The results are shown in Table 3.

COMPARATIVE EXAMPLE 4

A pigment powder (58.3 parts) having a slightly yellowish red color was prepared by operating in the same way as in Example 14. The bronzing and dispersibility of the resulting pigment powder were evaluated as in Example 1. The results are shown in Table 3.

TABLE 3

| | Hue | Bronzing (*) | Dispersibility (number of particles) |
|---|---|---|---|
| Example 14 | Slightly yellowish red | O | 45 |
| Comparative Example 4 | Slightly yellowish red | X | 378 |

(*): Same as the footnote to Table 1.

EXAMPLES 15–21 AND COMPARATIVE EXAMPLES 5–11

In each run, a reddish lake pigment was synthesized by a conventional method. The resulting pigment was treated with 5 parts, per 100 parts of the pigment, of N-(3-oleyloxy-2-hydroxypropyl)monolauryl dimethyl ammonium chloride in the same way as in Example 14 (Examples 15 to 21). The results were compared with the case of not treating the resulting pigments (Comparative Examples 5 to 11). The results are shown in Table 4.

TABLE 4

| Example (Ex.) or Comparative Example (CEx.) | Treatment | Pigment | Diazo component | Coupler component | Lake metal | Hue | Bronzing (*) | Dispersibility (number of particles) |
|---|---|---|---|---|---|---|---|---|
| Ex. 15 | Yes | C.I. Pigment Red 48:1 | 2-amino-5-methyl-4-chlorobenzenesulfonic acid | 3-hydroxy-2-naphthoic acid | Ba | Yellowish red | O | 18 |
| CEx. 5 | No | | | | | | X | 228 |
| Ex. 16 | Yes | C.I. Pigment Red 48:2 | 2-amino-5-methyl-4-chlorobenzenesulfonic acid | 3-hydroxy-2-naphthoic acid | Ca | Bluish red | O | 43 |
| CEx. 6 | No | | | | | | X | 529 |
| Ex. 17 | Yes | C.I. Pigment Red 48:4 | 2-amino-5-methyl-4-chlorobenzenesulfonic acid | 3-hydroxy-2-naphthoic acid | Mn | Red | O | 17 |
| CEx. 7 | No | | | | | | X | 435 |
| Ex. 18 | Yes | C.I. Pigment Red 53 | 2-amino-4-chloro-5-methylbenzenesulfonic acid | 2-naphthol | Ba | Yellowish red | O | 23 |
| CEx. 8 | No | | | | | | X | 337 |
| Ex. 19 | Yes | C.I. Pigment Red 63 | 2-aminonaphthalene-1-sulfonic acid | 3-hydroxy-2-naphthoic acid | Ca | Bordeaux | O | 52 |
| CEx. 9 | No | | | | | | X | 541 |
| Ex. 20 | Yes | C.I. Pigment Red 151 | 2-aminobenzenesulfonic acid | 3-hydroxy-2-naphthoic acid 4-sulfoanilide | Ba | Red | O | 24 |
| CEx. 10 | No | | | | | | X | 352 |

TABLE 4-continued

| Example (Ex.) or Comparative Example (CEx.) | Treatment | Pigment | Diazo component | Coupler component | Lake metal | Hue | Bronzing (*) | Dispersibility (number of particles) |
|---|---|---|---|---|---|---|---|---|
| Ex. 21 | Yes | C.I. Pigment Red 52 | 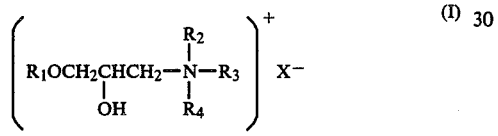 | 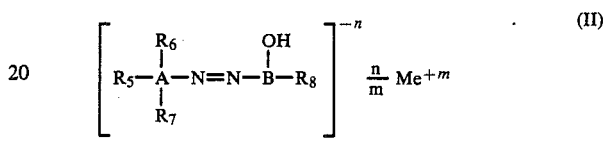 | Ca | Bluish red | O | 78 |
| CEx. 11 | No | | | | | | X | 562 |

(*) Same as the footnote to Table 1.

What is claimed is:

1. A non-bronzing reddish lake pigment obtained by treating a reddish lake pigment with an N-(3-alkoxy-2-hydroxypropyl)trialkylammonium salt represented by the general formula

  (I)

wherein each of $R_1$, $R_2$, $R_3$ and $R_4$ represents an alkyl group having 1 to 30 carbon atoms, and X represents a halogen atom, a sulfonic acid radical, an acetic acid radical or a formic acid radical.

2. The non-bronzing reddish lake pigment of claim 1 wherein the N-(3-alkoxy-2-hydroxypropyl)trialkylammonium salt is a compound of general formula (I) wherein each of $R_1$, $R_2$, $R_3$ and $R_4$ represents an alkyl group having 1 to 30 carbon atoms provided that at least one of them is an alkyl group having 8 to 18 carbon atoms, and X represents a halogen atom, a sulfonic acid radical, an acetic acid radical or a formic acid radical.

3. The non-bronzing reddish lake pigment of claim 1 wherein the N-(3-alkoxy-2-hydroxypropyl)trialkyl ammonium salt is a compound of general formula (I) wherein $R_1$ represents an alkyl group having 8 to 18 carbon atoms, $R_2$, $R_3$ and $R_4$ represent an alkyl group having 1 to 30 carbon atoms provided that at least one of them is an alkyl group having 8 to 18 carbon atoms, and X represents a halogen atom, a sulfonic acid radical, an acetic acid radical or a formic acid radical.

4. The non-bronzing reddish lake pigment of claim 1, 2 or 3 wherein the reddish lake pigment to be treated has a varying shade of red color ranging from red with a strong bluish tint to red with a strong yellowish tint.

5. The non-bronzing reddish lake of claim 1, 2 or 3 wherein the reddish lake pigment to be treated is a lake pigment obtained by using a coupling component having naphthalene as a skeleton.

6. The non-bronzing reddish lake pigment of claim 1, 2 or 3 wherein the reddish lake pigment to be treated is a naphthol-type azo lake pigment represented by the general formula

  (II)

wherein

A represents a phenyl or naphthyl group;

B represents a naphthyl group;

each of $R_5$, $R_6$ and $R_7$ represents a hydrogen atom, a halogen atom, an alkyl group having 1 to 4 carbon atoms, an alkoxy group having 1 to 4 carbon atoms, a carbomethoxy group, a carboethoxy group, a nitro group, a trifluoromethyl group, a carboxyl group, a sulfonic acid group, a carbamoyl group of the general formula

—CONH—$R_9$ in which $R_9$ represents a hydrogen atom, a phenyl group, a phenyl group substituted by halogen, $C_1$-$C_4$ alkyl, $C_1$-$C_4$ alkoxy, carbomethoxy, carboethoxy and/or nitro, a naphthyl group, and a naphthyl group substituted by halogen, $C_1$-$C_4$ alkyl, $C_1$-$C_4$ alkoxy, carbomethoxy, carboethoxy and/or nitro, a benzimidazolone group or a phthalimide group, or a carboxamide group of the general formula

—NHCO—$R_{10}$ in which $R_{10}$ represents a methyl group, an ethyl group, a phenyl group, a phenyl group substituted by halogen, $C_1$-$C_4$ alkyl, $C_1$-$C_4$ alkoxy, carbomethoxy, carboethoxy and/or nitro, a naphthyl group, and a naphthyl group substituted by halogen, $C_1$-$C_4$ alkyl, $C_1$-$C_4$ alkoxy, carbomethoxy, carboethoxy and/or nitro;

$R_8$ represents a carboxyl group, a sulfonic acid group, or a carbamoyl group of the general formula —CONH—$R_9$ which $R_9$ is as defined above;

with the proviso that 1 to 3 of $R_5$, $R_6$, $R_7$ and $R_8$ represent a carboxyl group and/or a sulfonic acid group;

Me represents a sodium atom, a potassium atom, a magnesium atom, a calcium atom, a strontium atom, a barium atom, a manganese atom or an aluminum atom;

n represents the number of carboxyl groups and/or sulfonic acid groups; and m represents the valency of Me.

7. The non-bronzing reddish lake pigment of claim 1, 2 or 3 wherein the reddish lake pigment to be treated is at least one pigment selected from the group consisting of C.I. Pigment Red 48, C.I. Pigment Red 49, C.I. Pigment Red 52, C.I. Pigment Red 53, C.I. Pigment Red 57, C.I. Pigment Red 58, C.I. Pigment Red 60, C.I. Pigment Red 63, C.I. Pigment Red 68, C.I. Pigment Red 81, C.I. Pigment Red 82, C.I. Pigment Red 83, C.I. Pigment Red 84, C.I. Pigment Red 90, C.I. Pigment Red 151, C.I. Pigment Red 172, C.I. Pigment Red 173, C.I. Pigment Red 174 and C.I. Pigment Red 247.

8. The non-bronzing reddish lake pigment of claim 1, 2 or 3 wherein the treatment with the N-(3-alkoxy-2-hydroxypropyl)trialkylammonium salt of general formula (I) is effected by adding the ammonium salt of general formula (I) to an aqueous suspension of the reddish lake to be treated, and stirring the mixture.

9. The non-bronzing reddish lake pigment of claim 1, 2 or 3 wherein the treatment with the N-(3-alkoxy-2-hydroxypropyl)trialkylammonium salt of general formula (I) is effected by flashing a water-wet cake of the untreated reddish lake pigment with an ink varnish in the presence of the ammonium salt of general formula (I).

10. The non-bronzing reddish lake pigment of claim 1, 2 or 3 wherein the amount of the N-(3-alkoxy-2-hydroxypropyl)trialkylammonium salt of general formula (I) is 0.1 to 30 parts by weight per 100 parts by weight of the reddish lake pigment to be treated.

11. The non-bronzing reddish lake pigment of claim 1, 2 or 3 wherein the amount of the N-(3-alkoxy-2-hydroxypropyl)trialkylammonium salt of general formula (I) is 0.5 to 10 parts by weight per 100 parts by weight of the reddish lake pigment to be treated.

* * * * *

UNITED STATES PATENT AND TRADEMARK OFFICE
CERTIFICATE OF CORRECTION

PATENT NO. : 4,711,674
DATED : December 8, 1987
INVENTOR(S) : HIROHITO ANDO, ET AL.

It is certified that error appears in the above-identified patent and that said Letters Patent is hereby corrected as shown below:

IN THE CLAIMS

Column 13, line 18, claim 8, after "lake", insert --pigment--.

Signed and Sealed this

Seventeenth Day of May, 1988

Attest:

DONALD J. QUIGG

Attesting Officer

Commissioner of Patents and Trademarks